(12) United States Patent
Chang et al.

(10) Patent No.: US 8,275,666 B2
(45) Date of Patent: Sep. 25, 2012

(54) USER SUPPLIED AND REFINED TAGS

(75) Inventors: Kenneth N. Chang, San Jose, CA (US);
David A. Koski, Cupertino, CA (US);
Pedraum R. Pardehpoosh, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1173 days.

(21) Appl. No.: 11/540,035

(22) Filed: Sep. 29, 2006

(65) Prior Publication Data
US 2008/0091549 A1   Apr. 17, 2008

(51) Int. Cl.
*G06Q 30/00* (2012.01)
(52) U.S. Cl. ............. 705/26.1; 705/26.61; 705/27.2
(58) Field of Classification Search .......... 705/26, 705/27, 26.1, 26.61, 27.2
See application file for complete search history.

(56) References Cited

U.S. PATENT DOCUMENTS 7,433,832 B1 * 10/2008 Bezos et al. ............. 705/26.8
2007/0043583 A1 * 2/2007 Davulcu et al. ............. 705/1

OTHER PUBLICATIONS flickr: Help/FAQ/Tags: http://www.flick.com/help/tags/.
flick: Explore/Tags/: http://www.flickr.com/photos/tags.
del.icio.us/help/tags: http://del.icio.us/help/tags.
Amazon.com: Help: http://www.amazon.com/gp/help/customer/display.html/ref=tag$_{13}$ dp.

* cited by examiner

*Primary Examiner* — Jeffrey A Smith
*Assistant Examiner* — Courtney Stopp
(74) *Attorney, Agent, or Firm* — Novak Druce + Quigg LLP

(57) ABSTRACT

Managing online content via user supplied and/or refined tagging is disclosed. In some embodiments, a selection of an item available from an online store is received, and one or more tags to be associated with the item are received from a member of an online community comprising users of the online store. In some embodiments, an indication of a degree of usefulness of a tag is received from a member of an online community, and an attribute of the tag is updated to reflect the indication.

23 Claims, 10 Drawing Sheets

| ITEM | DESCRIPTION | TAGS |
|---|---|---|
| MACBOOK PRO | ................. ................. | <COMPUTER> <PORTABLE> <POWERBOOK> |
| iMAC | ................. ................. ................. | <COMPUTER> <DESKTOP> <MAC> |
| ⋮ | ⋮ | ⋮ |

FIG. 6

USER SUPPLIED AND REFINED TAGS

BACKGROUND OF THE INVENTION

Tags are a form of metadata that describe an item available via a network, such as the Internet. Examples of tags include words or phrases that describe the item. Tags have been used to describe online content, such as articles, music, news reports, video clips, etc. Tags may be used to find items of interest, e.g., by entering one or more keywords into a search box to retrieve items that have a tag that matches one or more of the keywords. In this sense, tags serve as a sort of index of items available via the network.

One difficulty in using tags to help users find online content or other items of interest to them is that it can be hard to find what one is looking for if too many and varied tags are used to describe similar items. A user may enter a number of keywords, but not think to include all of or even any of the particular keywords used as tags for the items for which the user is looking. Likewise, if too restrictive a set of tags is allowed, the tag set may not be sufficient to describe in an accurate and/or intuitive way every item that it might be desired and/or useful to tag, and the tags made available for use may not be the ones a user would be most likely to use to find items of interest to the user.

Therefore, there is a need for a way to tag content or other items available online in a manner that better ensures that a user searching for items of interest to the user will be able to use the tag(s) to find the desired items.

BRIEF DESCRIPTION OF THE DRAWINGS

Various embodiments of the invention are disclosed in the following detailed description and the accompanying drawings.

FIG. 6 is a block diagram illustrating an embodiment of a user interface for displaying items and associated tags.

DETAILED DESCRIPTION

Figure 1:
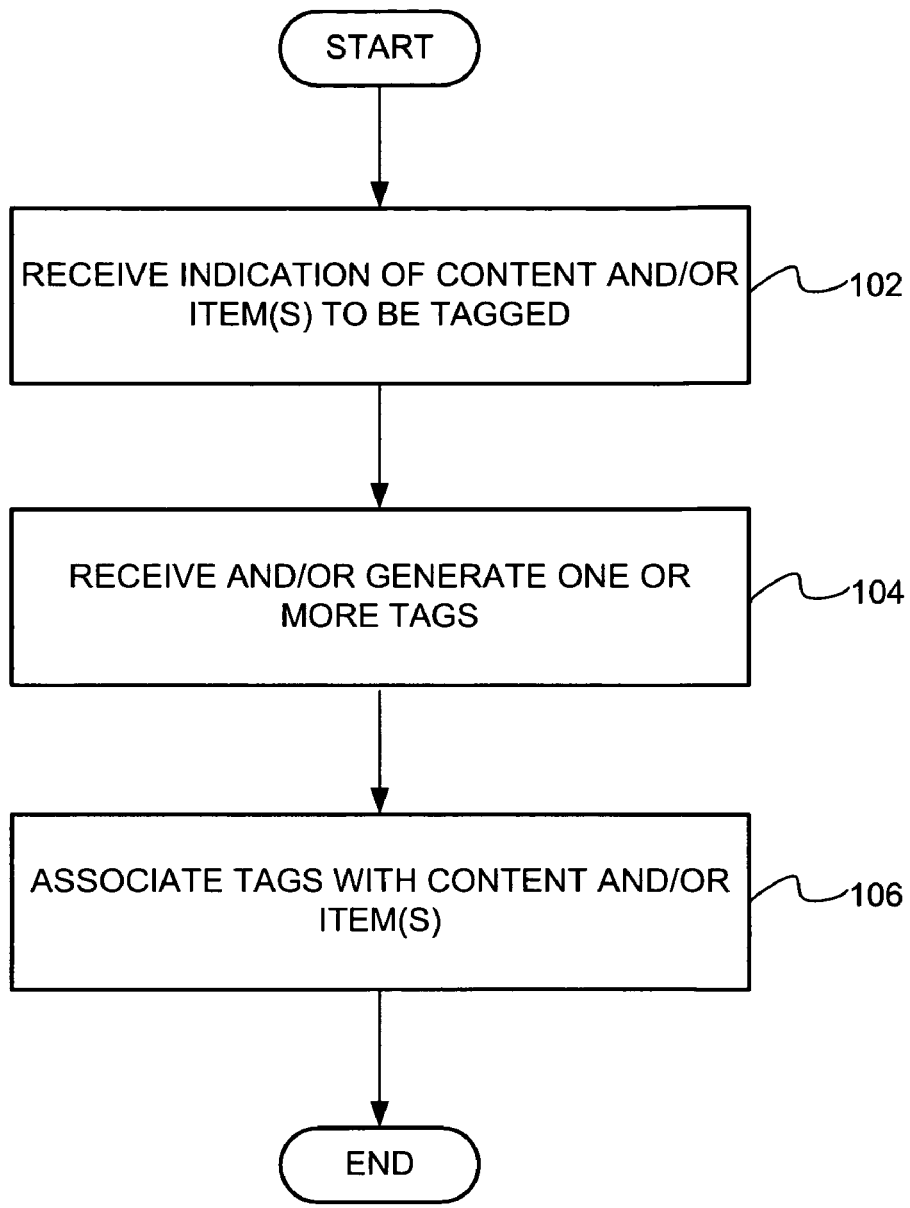
FIG. 1 is a flow chart illustrating an embodiment of a process for associating tags with an item.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

User supplied and/or refined tagging is disclosed. A provider of online content, such as a product review or recommendation, or other items available online, such as an item available for purchase from an online store, associates one or more tags with the item. In some embodiments, the item comprises a product review and/or a purchase recommendation (e.g., of a product or system, such as a collection of products configured in a recommended manner) provided by a user (e.g., consumer) of an online store and/or a member of some other online community. The user supplies an initial set of one or more tags. Other members of the online community, e.g. other customers of the online store, upon viewing the item are provided with an opportunity to provide feedback regarding the usefulness of particular tags, to suggest that tags be removed and/or that additional tags be added, and/or to correct typographical or other errors found in tags. In some embodiments, at least partially automated processing—for example, text analysis, linguistic analysis, spell checking, thesaurus checking, questions posed to content owner, finding tags associated with similar items, data mining browsing/purchase records of the online store to determine how tags are used and which seem to be useful to users, etc.—is used to generate, suggest, and/or expand tags and/or to determine respective weights and/or relevance/usefulness scores of tags associated with an item. In some embodiments, the item comprises an automatically generated summary of a plurality of product reviews.

FIG. 1 is a flow chart illustrating an embodiment of a process for associating tags with an item. An indication is received that an item, e.g., a product available from an online store, a product review or recommendation, or a content item available for display and/or download, is to be tagged (102). In various embodiments, the indication includes receiving an indication that a "tag" or "edit tags" control has been selected by a user while viewing the item; an indication that a new item, such as a user-supplied product review or recommendation, e.g., a recommendation to purchase a product or a set of two or more products has been uploaded and/or otherwise submitted; and selection by a user of a particular tag already associated with the item. One or more tags (or additional tags)

are received and/or automatically generated (104). In some embodiments, tags are received via an interface presented to a user via a network, such as the Internet. The user is prompted to enter tags, in various embodiments by asking the user submitting and/or viewing the item to enter tags and/or keywords/phrases, asking the user how he/she uses the item and/or expects other potentially interested users would use the item and/or products described therein (e.g., in the case of a product review), etc. In some embodiments, tags (or additional tags) may be generated automatically, e.g., by analyzing text or other content comprising and/or associated with the item to identify key words and/or phrases, themes, product names, product type identifiers, etc. In some embodiments, a thesaurus or similar resource may be used to expand an existing set of tags to include synonyms of tags in the existing set, especially where a synonym or otherwise related tag has been determined to be more useful than an existing tag to users searching for items of the same type as the one currently being tagged. The received and/or generated tags are associated with the item (106). In some embodiments, tags are associated with an item by storing the tags in a metadata record included in and/or with and/or otherwise associated with the item.

Figure 2:
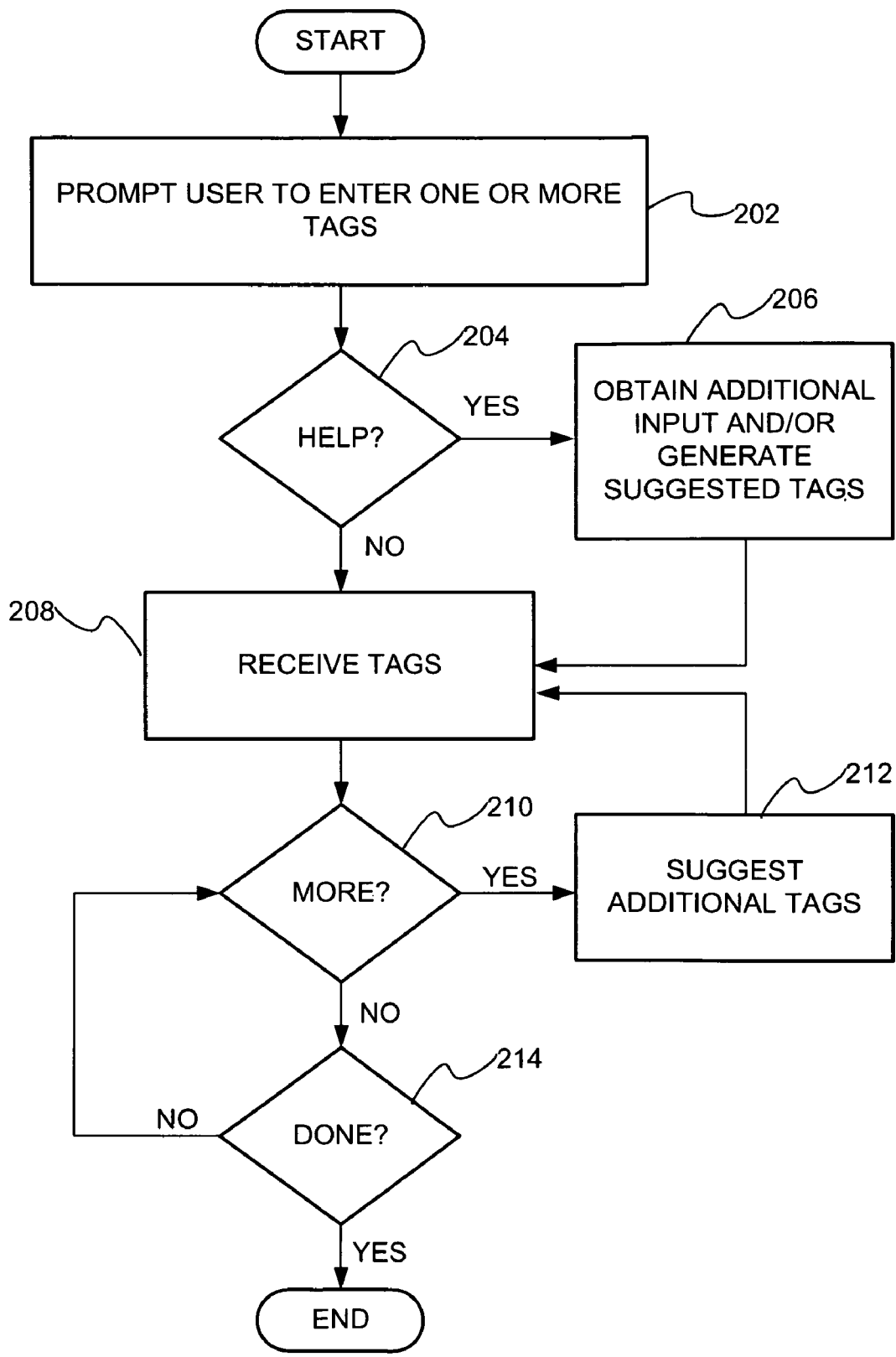
FIG. 2 is a flow chart illustrating an embodiment of a process for receiving and/or generating tags.

FIG. 2 is a flow chart illustrating an embodiment of a process for receiving and/or generating tags. In some embodiments, 104 of FIG. 1 includes the process of FIG. 2. A user is prompted to enter one or more tags (202). If the user requests (and/or it is otherwise determined that the user needs) help (204), in various embodiments additional input is obtained from the user (e.g., the user is asked how the user uses the item and/or intends for others to use the item and/or a product or system described therein) and/or tags (or additional tags) are generated and suggested to the user (206). In some various embodiments, tags are generated through textual and/or linguistic analysis of the item; mining a body of transaction, browsing, and/or user feedback on the usefulness of tags; finding tags that have the same meaning, root, and/or are otherwise related to an existing tag; and identifying tags that other users have chosen to associated with the same or similar items. One or more tags are received (208). If an indication is received that more tags are required and/or desired (210), e.g., an indication that the user has selected a "help me generate more tags" control, or the user has not provided at least a prescribed minimum number of tags, additional tags are suggested to the user (212). In some embodiments, one or more of the techniques described above to generate suggested tags (206) are used to suggest additional tags (212). The process continues until an indication is received that the user is done tagging the item (214), e.g., the user selected a "done" or "submit" control, a timer times out without any further user input, a maximum number of tags is received, etc., after which the process ends.

Figure 3:
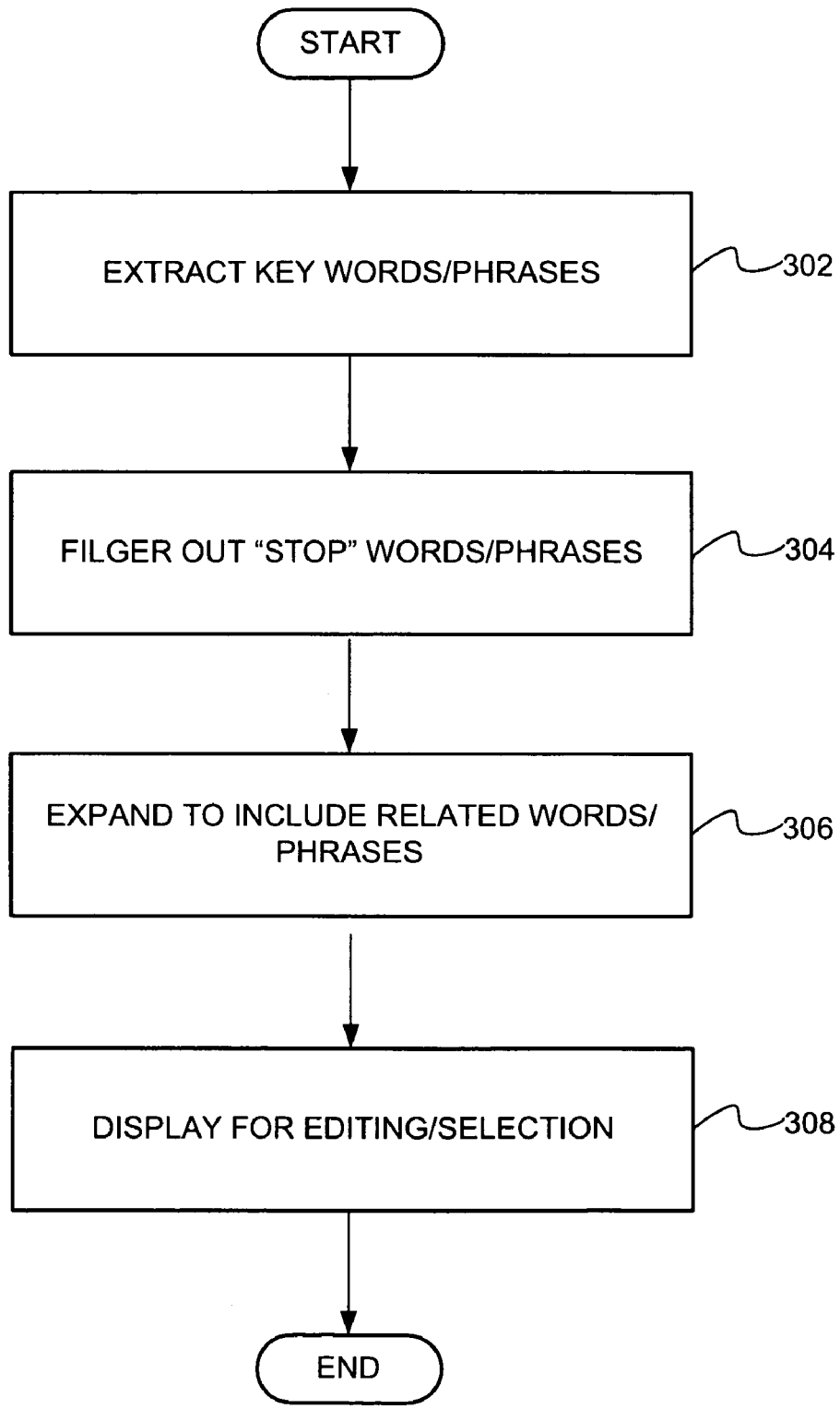
FIG. 3 is a flow chart illustrating an embodiment of a process for suggesting tags.

FIG. 3 is a flow chart illustrating an embodiment of a process for suggesting tags. In various embodiments, 206 and/or 212 of FIG. 2 includes all or part of the process of FIG. 3. Key words and/or phrases are identified in the item and/or in content associated with the item (302). For example, in the case of a product review or recommendation submitted by a user (customer) of an online store, key words or phrases may be identified in the review and/or text explaining or describing the recommendation, and/or in product specifications, marketing materials, or other content associated with the reviewed and/or recommendation product. "Stop" words and phrases, such a superlatives, obscene or otherwise prohibited language, proper names, etc., are filtered out of the list of key words and phrases (304). The set of key words and phrases is expanded to include at least some additional words and/or phrases related to words or phrases already included in the set (306). Examples of such expansion include additional words having the same root as an existing word; words or phrases having the same meaning, in the relative context, as an existing word or phrase; words or phrases used by others to tag a similar item; tags identified explicitly by other online users as being useful in connection with similar items; and tags used by other online users to find similar items. The filtered and expanded list of key words and phrases is displayed for editing (308). In some embodiments, a checkbox or other control is displayed to enable the user to select all, none, or selected ones of the key words and phrases to become tags associated with the item.

Figure 4:
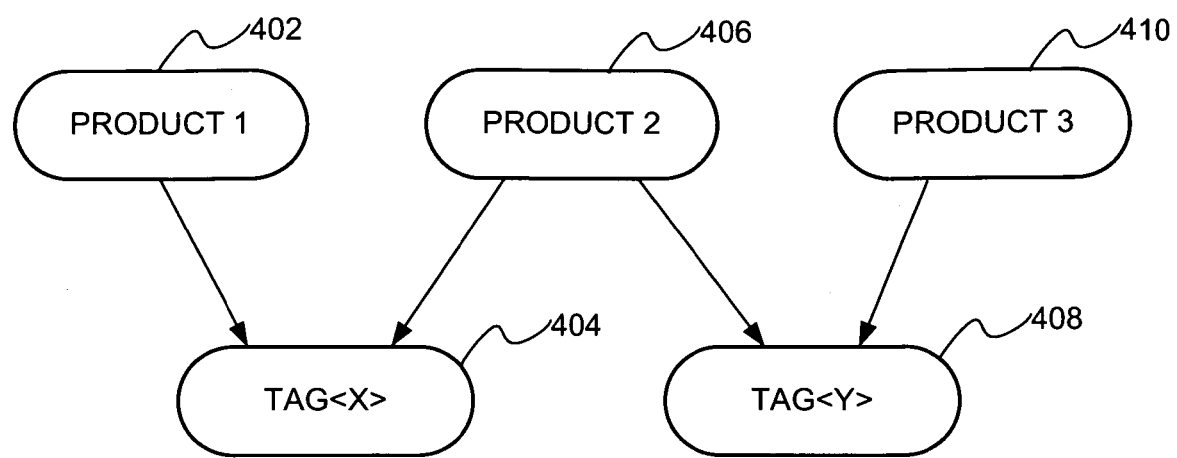
FIG. 4 is a block diagram illustrating an example of a set of item-tag relationships such as may be used in some embodiments to suggest tags.

FIG. 4 is a block diagram illustrating an example of a set of item-tag relationships such as may be used in some embodiments to suggest tags. In the example shown, a first product (402) has had a tag <x> (404) associated with it; a second product (406) has had tag <x> (404) and a tag <y> (408) associated with it; and a third product (410) has had tag <y> (408) associated with it. In some embodiments, the information shown in FIG. 4 may be used to suggest that the tag <y> also be associated with the first product (402), since both the first product (402) and the second product (406) have had the same tag <x> (404) associated with them. In some embodiments, second or third degree relationships may be used, e.g., if relying only on first degree relationships (e.g., common tag, such as the first and second products in this example) does not generate enough tags and/or items having a second or third degree relationship (e.g., the relationship between the first and third products in this example, i.e., each has a different common tag with a third item, here the second product) has associated with it a tag that users have identified as being particularly useful. For example, in the example shown a tag <z>, not shown in FIG. 3, associated with the third product (410) might be suggested for use with the first product (402), etc.

Figure 5:
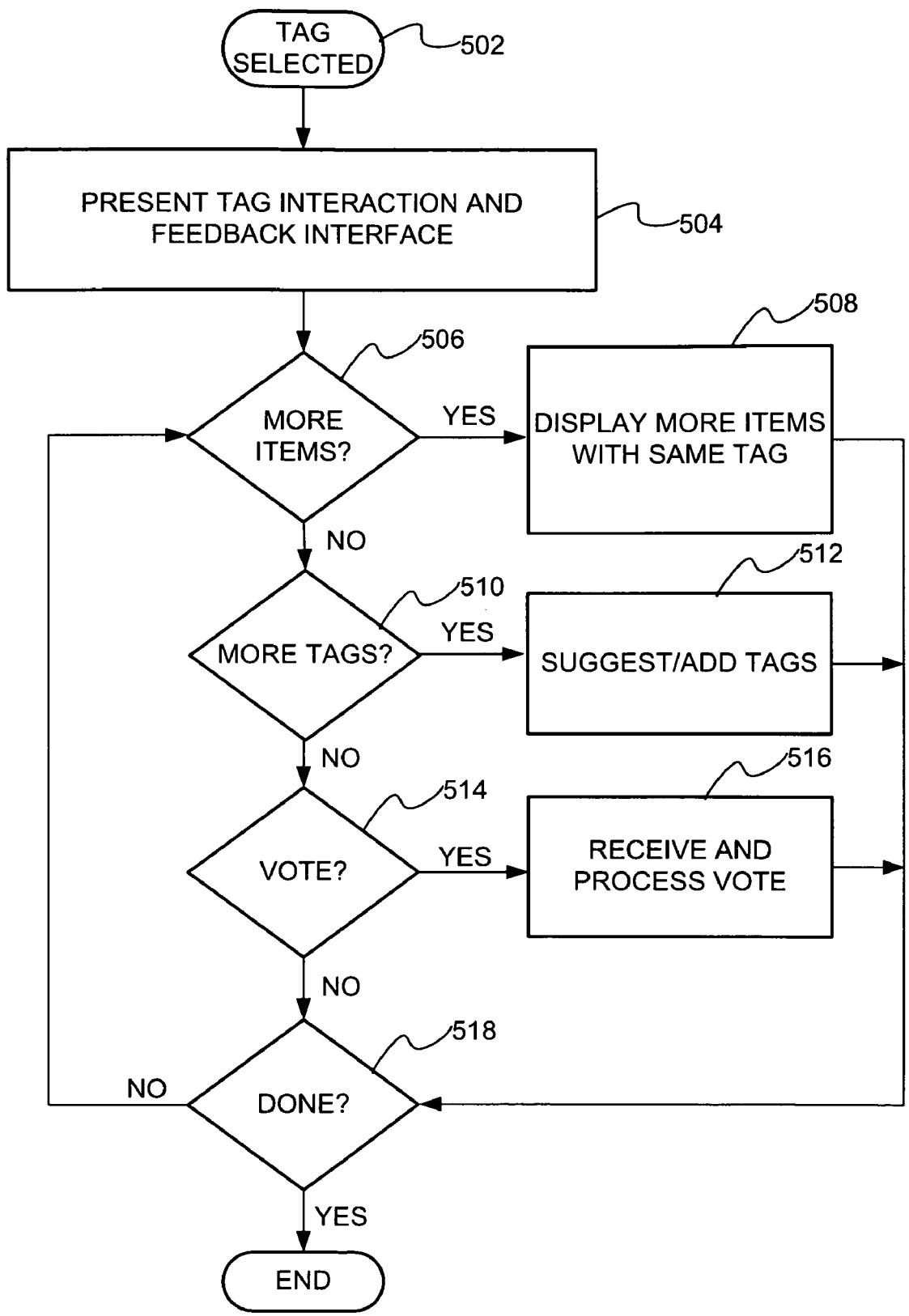
FIG. 5 is a flow chart illustrating an embodiment of a process for receiving and processing user community input regarding tags.

FIG. 5 is a flow chart illustrating an embodiment of a process for receiving and processing user community input regarding tags. In the example shown, upon receipt of an indication that a tag has been selected (502), a tag interaction and feedback interface (e.g., a web or other display page) is presented (504). In some embodiments, the display page includes controls to indicate what the user wants to do. In this example, the user is provided with controls to request more items that have been tagged with the selected tag; request that additional tags be suggested for and/or associated with the item; and vote (or otherwise provide feedback) on the usefulness of the tag in the context in which it was viewed/selected. In some embodiments, instead of providing an interface with the foregoing controls, the same options are made available via a menu, such as one displayed upon entry of a right click or similar input at a time when a cursor is positioned over the tag, or when the tag has been highlighted, checked, etc. If display of more items having the same tag is requested (506), the tag is used to find and display more items having that tag (508). If a request is received to associated more tags with the item (510), additional tags are suggested (if requested explicitly, e.g., or if the user has not entered any additional tags in a text entry box displayed and labeled as being for that purpose) and/or associated with the item (512). If the user has indicated a desire to vote (or otherwise provide feedback) on the usefulness of the tag (514), the vote is received and processed (516). In various embodiments, user feedback is used to add or remove tags from an item (e.g., deleted tags that many users indicate are not useful); determine an order and/or manner in which tags will be displayed (e.g., most useful tags in bold), organize an online store or other set of content by category (e.g., by associating each item with one or more categories based on the tags that have been identified as being most useful for that item); and to identify tags to be suggested for use with other, similar items (e.g., only the most useful tags are suggested for an item that has only a second or higher degree relationship with an item with which the tags have already been associated). In the example shown, the tag interaction and feedback interface is presented and actions requested via the interface taken until an indication is received that the user is done (e.g., closes window, enters back arrow control, etc.) (518), after which the process ends.

FIG. 6 is a block diagram illustrating an embodiment of a user interface for displaying items and associated tags. In the example shown, the display (600) includes an item column (602), a description column (604), and a tag column (606). The information associated with each respective item is displayed in a corresponding row, with the item name being displayed in the item column (602), text describing the item being displayed in the description column (604), and at least a subset of the tags, if any, associated with the item being displayed in the tag column (606). In the example shown, the MacBook Pro™ is shown as having the tags <computer>, <portable>, and <PowerBook> associated with it; and the iMac™ is shown as having the tags <computer>, <desktop>, and <Mac> associated with it.

Figure 7:
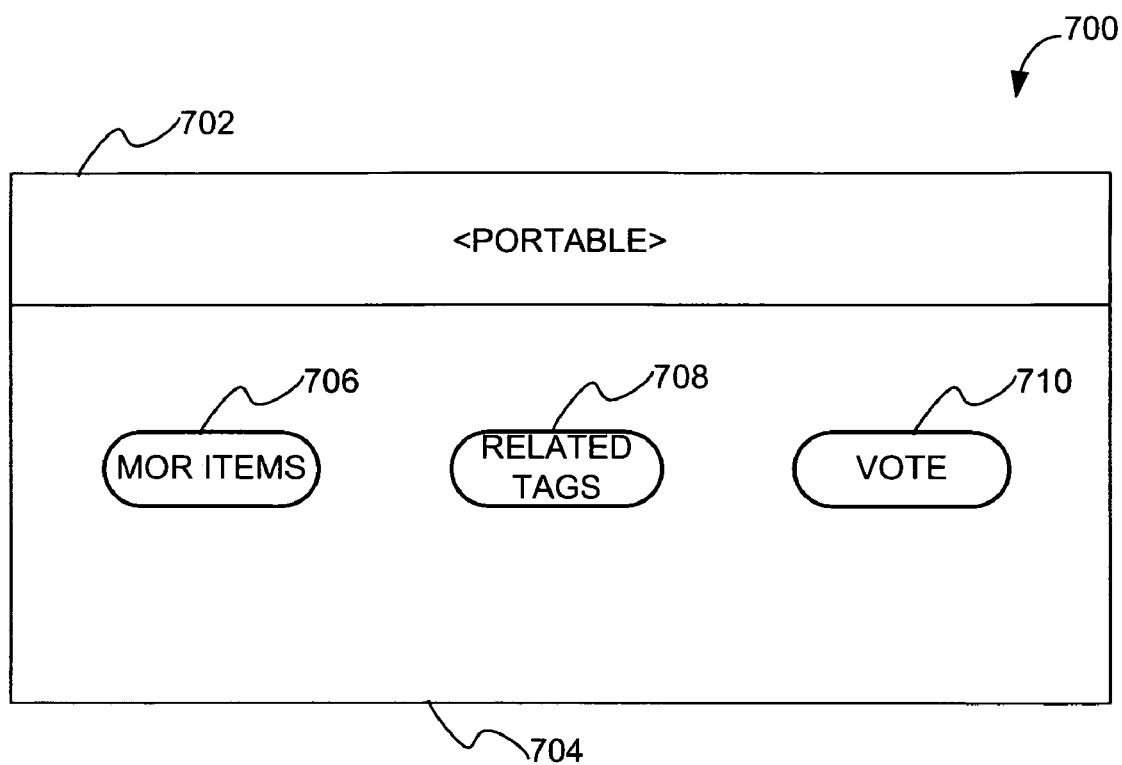
FIG. 7 is a block diagram illustrating an embodiment of a user interface for displaying controls to request actions associated with a particular tag.

FIG. 7 is a block diagram illustrating an embodiment of a user interface for displaying controls to request actions associated with a particular tag. In the example shown, the display (700) shows the tag <portable> as having been selected. The tag is displayed in a tag display region (702) and associated controls are shown in a control region (704). The controls include in this example a "more items" control (706) which, when selected, causes more items having the same tag to be displayed; a "related tags" control (708) which, when selected, results in additional tags related to the displayed tag to be displayed, e.g., for use in further browsing, expanding the tag set for the item currently being viewed, etc.; and a "vote" control (710) that enables the user to provide feedback on the usefulness of the tag.

Figure 8:
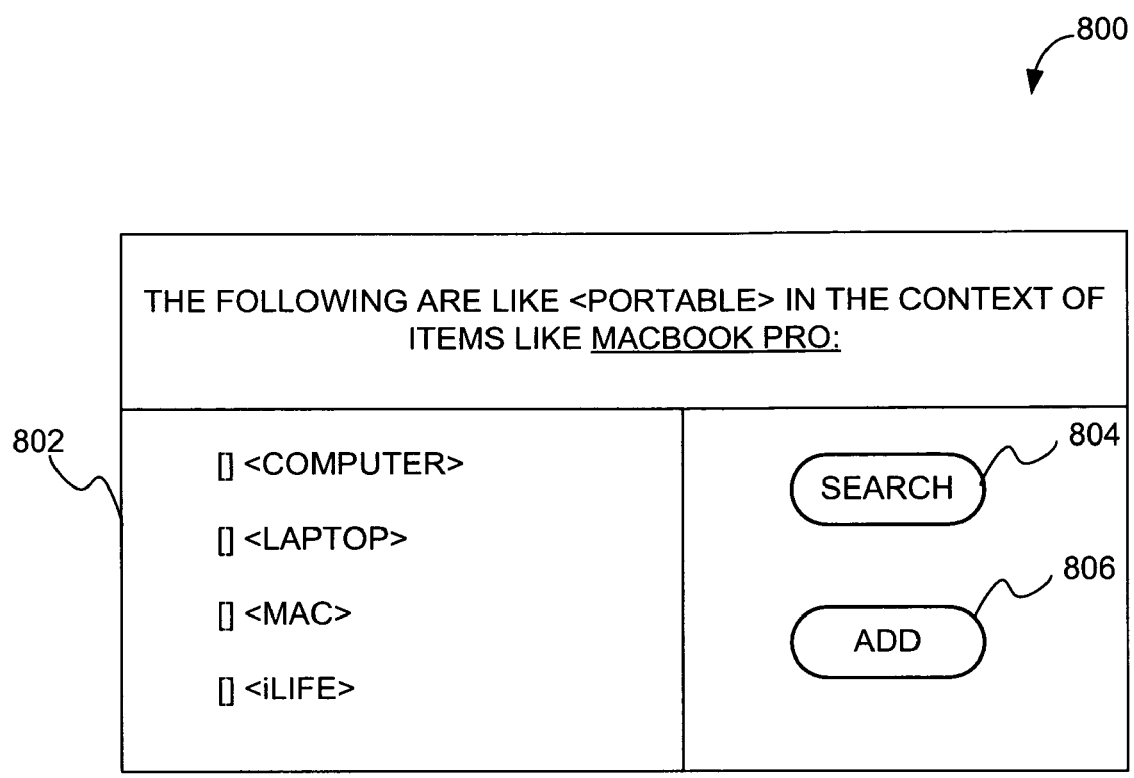
FIG. 8 is a block diagram illustrating an embodiment of a user interface for displaying and providing functionality with respect to tags related to a selected tag.

FIG. 8 is a block diagram illustrating an embodiment of a user interface for displaying and providing functionality with respect to tags related to a selected tag. In the example shown, the display (800) includes a list (802) of tags determined to be related to the selected tag. In the example shown, each tag in the list of related tags has a checkbox control adjacent to it. The list in this example includes the tag <computer>, which is already associated with this item. In some embodiments, tags already associated with the current item would be filtered out of the list of related tags. In the example shown, the tag <laptop> is shown, e.g., because it has been determined to have the same or similar meaning to the selected tag <portable> in this contents (i.e., computers). The tag <mac> is included, e.g., because it has the same root as the item "MacBook Pro"; is associated with similar items (e.g., iMac™, PowerBook™); and/or has been identified by users as having been useful to them in finding this and/or similar items. In the example shown, the tag <iLife™> may have been included because it is mentioned, e.g., a number of times, in product literature, reviews, and/or other content associated with the item, e.g., as an item bundled with the item currently being viewed. The display (800) includes a "search" button (804) which, when selected, causes additional items having the tag(s) for which the checkbox is checked in the display (800) to be retrieved. The display (800) also includes an "add" button (806) which, when selected, results in any tag(s) for which the checkbox is checked in the display (800) to be added to the set of tags associated with the item currently being viewed.

Figure 9:
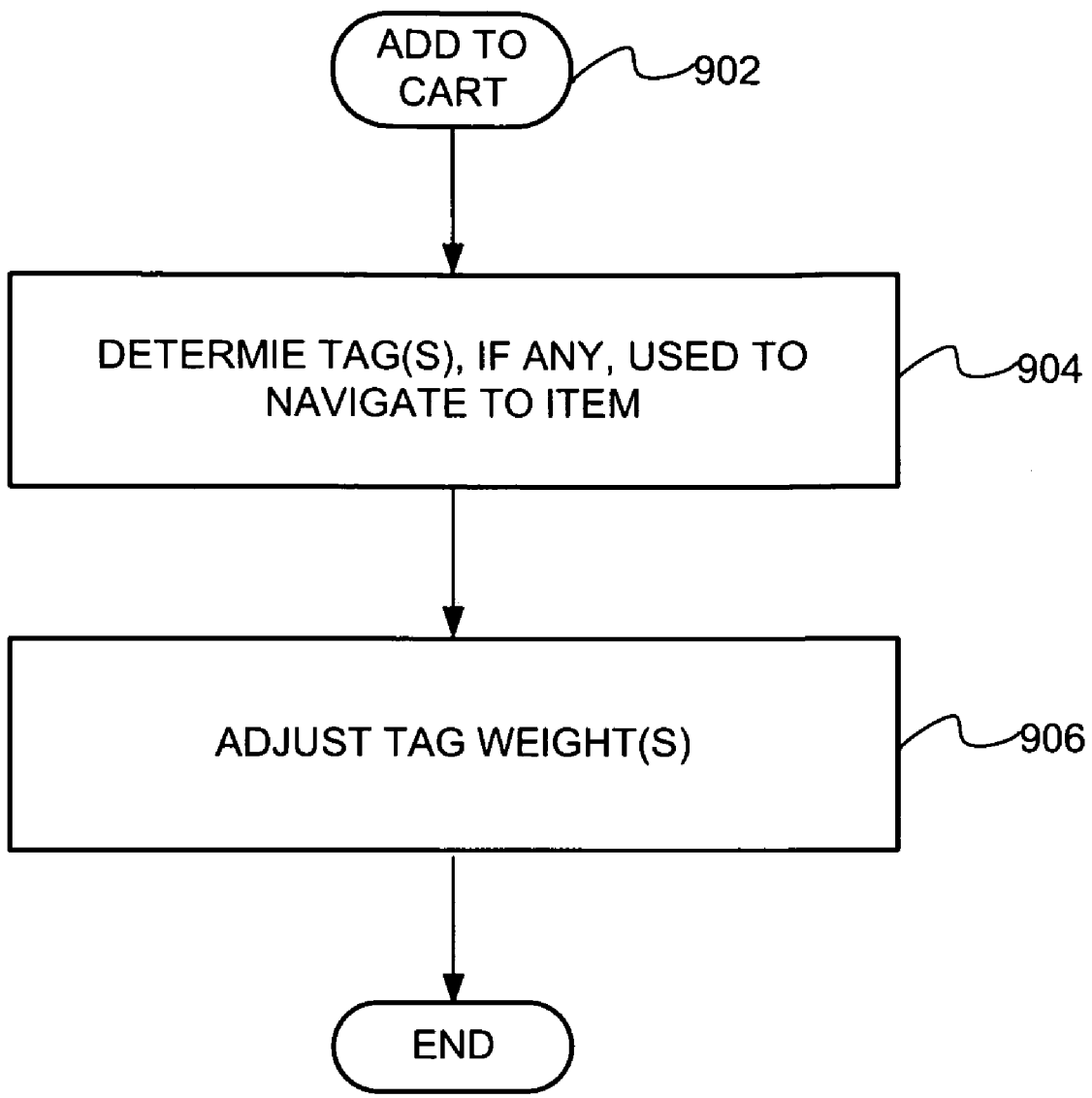
FIG. 9 is a flow chart illustrating an embodiment of a process for dynamically adjusting a tag's usefulness weighting/score.

FIG. 9 is a flow chart illustrating an embodiment of a process for dynamically adjusting a tag's usefulness weighting/score. In the example shown, an indication is received that an item has been added by a user to his/her online shopping cart (902). It is determined which tag or tags, if any, were used by the user to find the item added to his/her cart (904). The respective usefulness weighting/score of each tag used to find the item is adjusted (e.g., increased) to reflect the use of the tag to find the item added by this user to his/her cart (906). In various embodiments, the usefulness weighting/score, adjusted over time based on the process of FIG. 9, user feedback, and/or other factors, affects whether and/or under what circumstances a tag is suggested, whether a tag is added or removed, the order and/or manner in which tags are displayed within a set, etc. In some embodiments, a tag's usefulness weighting/score is decayed over time, so that more recent feedback, transactions, etc. have a greater affect on the usefulness weighting/score than older feedback/transactions.

Figure 10:
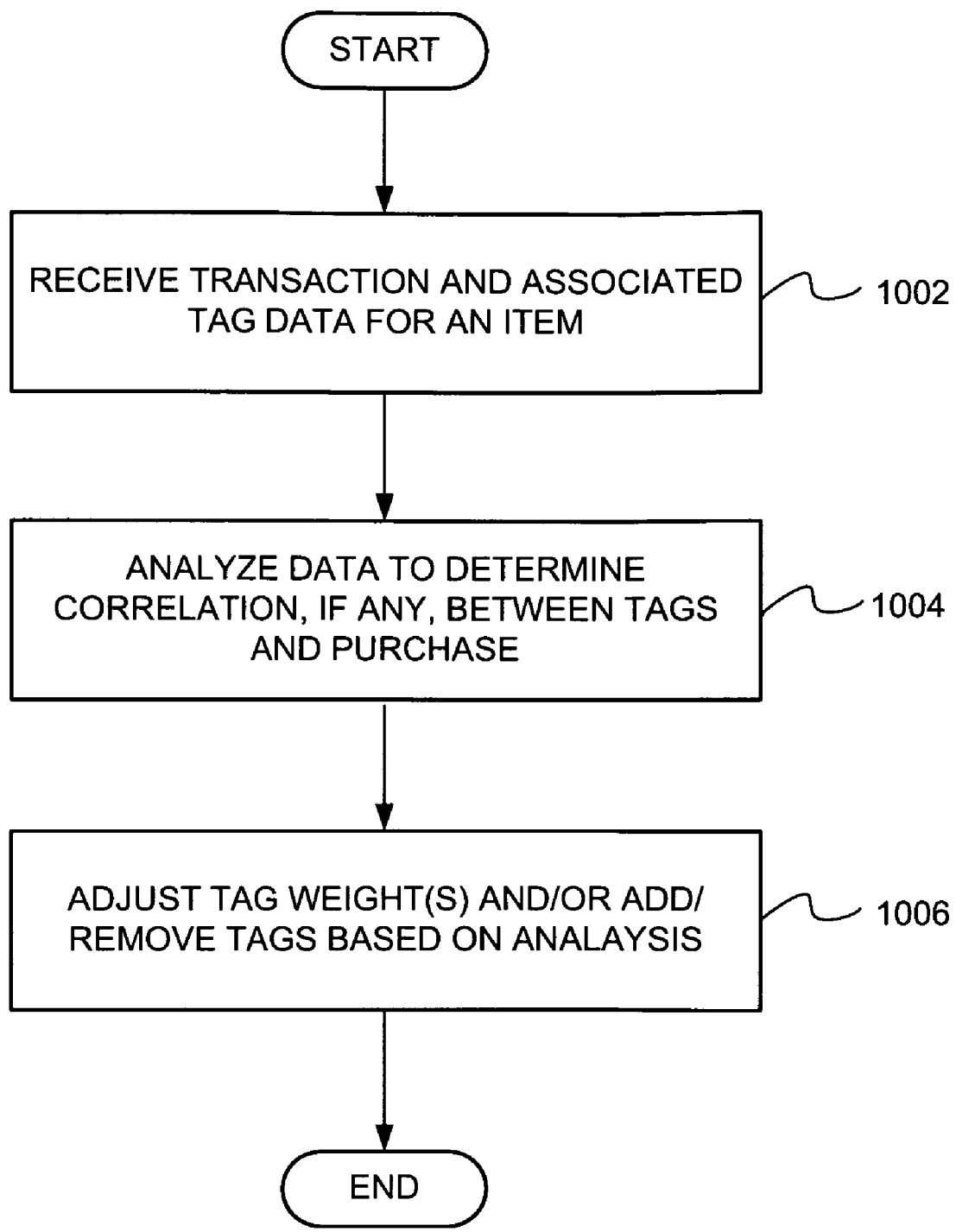
FIG. 10 is a flow chart illustrating an embodiment of a process for mining transaction data to determine the relative usefulness of tags.

FIG. 10 is a flow chart illustrating an embodiment of a process for mining transaction data to determine the relative usefulness of tags. In the example shown, transaction and associated tag data is received (1002). Examples of transaction and associated tag data include data indicating for each transaction in which a particular item (or type of item) was purchased that tag(s) used by the purchaser, if any, to find the item. The transaction and tag data is analyzed to determine the relative (apparent) correlation between particular tags and the purchase event (1004). Tag weightings are adjusted, and/or tags added/removed, based on the analysis (1006).

Using the techniques described herein, a robust, coherent, and useful set of tags is generated and maintained by using explicit and implicit input and/or feedback from members of an online community, such as customers of an online store, to generate and/or refine a set of tags for items made available to the members, such as products available for purchase from the online store, customer-supplied and/or other reviews of such products, customer-supplied and/or other recommendations to purchase a product or set of products, and/or other content or items.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing online content, comprising:
receiving at a processor a selection of a first item available from an online store;
receiving from a member of an online community comprising users of the online store a first tag to be associated with the first item;
associating the first tag with the first item;
receiving from another member of the online community feedback regarding usefulness of the association between the first tag and the first item;
updating an attribute of the first tag to reflect the feedback; and
associating a second tag with the first item based on a relationship between the first item associated with the first tag and a second item associated with the second tag, wherein associating the second tag with the first item includes storing the second tag in a metadata record of the first item.

2. A method as recited in claim 1, wherein receiving feedback comprises suggesting one or more suggested tags to the member.

3. A method as recited in claim 2, wherein the one or more suggested tags are determined by one or more of the following: analysis of a text comprising the first item; analysis of a text associated with the first item; a linguistic analysis; a semantic analysis; performing a spelling check of one or more tags submitted by the member; an identification of tags having the same or similar meaning as one or more tags already associated with the first item; an identification of one or more tags associated with one or more other items determined to be the same as or similar to the first item; an identification of one or more tags associated with one or more other items determined to be related to the first item; mining a body of online purchase transaction data; and mining a body of web page navigation data.

4. A method as recited in claim 1, wherein the first item comprises one or more of the following: a product; an item of content available for download or purchase; a set of two or more related products; a product review; an automatically generated summary of multiple product reviews; a set of two or more products recommended by another member to be purchased as a group; and a text associated by another member with a set of two or more products recommended by the other member to be purchased as a group.

5. A method as recited in claim 1, wherein the feedback comprises one or more of the following: a vote; a rating; a comment; a request to add a tag, a request to remove a tag; a query that includes the first tag; a selection of the first tag while browsing; an indication that a user has browsed to an item associated with the first tag; an indication that the user has added an item associated with the first tag to an online shopping cart; and an indication that the user has purchased an item with which the tag is associated.

6. A method as recited in claim 1, further comprising receiving from a second member of the online community one or more additional tags to be associated with the first item.

7. A method as recited in claim 1, wherein receiving a selection of the first item comprises one or more of the following: receiving a selection of a control associated with the first item; receiving a selection of a control associated with tagging the first item; receiving a request for a web or other display page associated with the first item; receiving the first item from the member; receiving an identifier associated with the first item; and receiving from the first member a data associated with the first item.

8. A method as recited in claim 1, wherein the attribute comprises one or more of the following: a location in which the tag is displayed within a displayed set of tags; a style attribute of a text or other visual representation of the tag; and a usefulness or other score or weight associated with the tag.

9. A method as recited in claim 1, wherein the relationship is a first degree relationship including a shared tag between the first item and the second item.

10. A method as recited in claim 1, wherein the relationship includes one or more shared tags between the first item, an intermediate item, and the second item.

11. A system for managing online content, comprising:
a processor configured to:
receive a selection of a first item available from an online store;
receive from a member of an online community comprising users of the online store a first tag to be associated with the first item;
receive from another member of the online community feedback regarding usefulness of the association between the first tag and the first item;
update an attribute of the first tag to reflect the feedback; and
associate a second tag with the first item based on a relationship between the first item associated with the first tag and a second item associated with the second tag, wherein the second tag is associated with the first item including by storing the second tag in a metadata record of the first item; and
a memory coupled to the processor and configured to provide instructions to the processor.

12. A system as recited in claim 11, wherein to receive feedback comprises suggesting one or more suggested tags to the member.

13. A system as recited in claim 12, wherein the one or more suggested tags are determined by one or more of the following: analysis of a text comprising the first item; analysis of a text associated with the first item; a linguistic analysis; a semantic analysis; performing a spelling check of one or more tags submitted by the member; an identification of tags having the same or similar meaning as one or more tags already associated with the first item; an identification of one or more tags associated with one or more other items determined to be the same as or similar to the first item; an identification of one or more tags associated with one or more other items determined to be related to the first item; mining a body of online purchase transaction data; and mining a body of web page navigation data.

14. A system as recited in claim 11, wherein the processor is further configured to receive from one or more other members of the online community an indication of a degree of usefulness of the first tag.

15. A system as recited in claim 11, wherein the processor is further configured to receive from a second member of the online community one or more additional tags to be associated with the first item.

16. A system as recited in claim 11, wherein to receive a selection of the first item comprises one or more of the following: receiving a selection of a control associated with the first item; receiving a selection of a control associated with tagging the first item; receiving a request for a web or other display page associated with the first item; receiving the first item from the member; receiving an identifier associated with the first item; and receiving from the member a data associated with the item.

17. A system as recited in claim 11, wherein the feedback comprises one or more of the following: a vote; a rating; a comment; a request to add a tag, a request to remove a tag; a query that includes the first tag; a selection of the first tag while browsing; an indication that the user has browsed to an item associated with the first tag; an indication that the user has added an item associated with the first tag to an online shopping cart; and an indication that the user has purchased an item with which the first tag is associated.

18. A system as recited in claim 11, wherein the attribute comprises one or more of the following: a location in which the first tag is displayed within a displayed set of tags; a style attribute of a text or other visual representation of the first tag; and a usefulness or other score or weight associated with the first tag.

19. A computer program product for managing online content, the computer program product being embodied in a non-transitory computer readable medium and comprising computer instructions for:

receiving a selection of a first item available from an online store;

receiving from a member of an online community comprising users of the online store a first tag to be associated with the first item;

receiving from another member of the online community feedback regarding usefulness of the association between the first tag and the first item;

updating an attribute of the first tag to reflect the feedback and associating a second tag with the first item based on a relationship between the first item associated with the first tag and a second item associated with the second tag, wherein associating the second tag with the first item includes storing the second tag in a metadata record of the first item.

20. A computer program product as recited in claim 19, wherein receiving feedback comprises suggesting one or more suggested tags to the member.

21. A computer program product as recited in claim 19, wherein the feedback comprises one or more of the following: a vote; a rating; a comment; a request to add a tag, a request to remove a tag; a query that includes the first tag; a selection of the first tag while browsing; an indication that a user has browsed to an item associated with the first tag; an indication that the user has added an item associated with the first tag to an online shopping cart; and an indication that the user has purchased an item with which the tag is associated.

22. A computer program product as recited in claim 19, further comprising receiving from a second member of the online community one or more additional tags to be associated with the first item.

23. A computer program product as recited in claim 19, wherein the attribute comprises one or more of the following: a location in which the tag is displayed within a displayed set of tags; a style attribute of a text or other visual representation of the tag; and a usefulness or other score or weight associated with the tag.

* * * * *